United States Patent
Aketa et al.

(10) Patent No.: US 8,793,974 B2
(45) Date of Patent: Aug. 5, 2014

(54) EXHAUST GAS TREATMENT DEVICE OF DIESEL ENGINE

(75) Inventors: Masahiro Aketa, Sakai (JP); Satoshi Sugimoto, Sakai (JP); Masato Ueda, Sakai (JP); Yuki Yoshita, Sakai (JP); Takuya Yanagimoto, Sakai (JP); Masayuki Tochimoto, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 243 days.

(21) Appl. No.: 13/255,951

(22) PCT Filed: Mar. 12, 2010

(86) PCT No.: PCT/JP2010/054216
§ 371 (c)(1),
(2), (4) Date: Sep. 12, 2011

(87) PCT Pub. No.: WO2010/125865
PCT Pub. Date: Nov. 4, 2010

(65) Prior Publication Data
US 2012/0000186 A1    Jan. 5, 2012

(30) Foreign Application Priority Data

Apr. 30, 2009 (JP) ................................. 2009-110495
Feb. 1, 2010 (JP) ................................. 2010-019932

(51) Int. Cl.
*F01N 3/00* (2006.01)

(52) U.S. Cl.
USPC .................................. 60/275; 60/311; 60/278

(58) Field of Classification Search
USPC .................................... 60/275, 274, 311, 278
See application file for complete search history.

(56) References Cited

U.S. PATENT DOCUMENTS

| 4,478,613 | A | * | 10/1984 | Brettschneider et al. | 96/61 |
| 4,689,951 | A | * | 9/1987 | Polach | 60/275 |
| 5,486,993 | A | * | 1/1996 | Sakurai et al. | 363/98 |

FOREIGN PATENT DOCUMENTS

| CA | 714367 A | 7/1965 |
| JP | H02-187113 A | 7/1990 |

(Continued)

OTHER PUBLICATIONS

Int'l Search Report issued Jun. 8, 2010 in Int'l Application No. PCT/JP2010/054216.

(Continued)

*Primary Examiner* — Thomas Denion
*Assistant Examiner* — Kelsey Stanek
(74) *Attorney, Agent, or Firm* — Panitch Schwarze Belisario & Nadel LLP (57) ABSTRACT

The present invention relates to an exhaust gas treatment device of a diesel engine that is capable of increasing the concentration of PM in the EGR gas, wherein an exhaust gas separator 2 has electrodes 12 and 13 having different polarities from each other to allow the PM in the exhaust gas 3 to be charged to a given polarity by means of corona discharge between the electrodes 12 and 13 and thus to permit a peripheral wall 14 surrounding the exhaust gas swirl chamber 9 to have the electrode 13 having the opposite polarity to the charged PM, and the charged PM in the exhaust gas 3 swirling the exhaust gas swirl chamber 9 is localizedly positioned around the peripheral wall 14 of the exhaust gas swirl chamber 9 through a centrifugal force and an electrostatic force to allow the exhaust gas 3 containing the localizedly positioned PM to be separated as the EGR gas 4 and sent to a terminal end portion 15 of the exhaust gas swirl chamber 9, while the exhaust gas 3 around the central cylinder 7 is being separated as the emission gas 5 and sent to the interior of the central cylinder 7 through the plurality of emission gas entry holes 8.

20 Claims, 8 Drawing Sheets

(56) References Cited

FOREIGN PATENT DOCUMENTS

| | | | |
|---|---|---|---|
| JP | 3-207463 A | | 9/1991 |
| JP | 3207463 | * | 9/1991 |
| JP | H05-222915 A | | 8/1993 |
| JP | H05-277313 A | | 10/1993 |
| JP | 2003-106137 A | | 4/2003 |
| JP | 2003106137 | * | 4/2003 |
| JP | 2006-346538 A | | 12/2006 |
| JP | 2006346538 | * | 12/2006 |
| JP | 2007-278194 A | | 10/2007 |
| JP | 2007278194 | * | 10/2007 |

OTHER PUBLICATIONS

Office Action issued May 21, 2013 in JP Application No. 2010-019932.

Decision to Grant a Patent issued Aug. 7, 2013 in JP Application No. 2010-019932.

Office Action issued Oct. 18, 2013 in CN Application No. 201080012932.8.

* cited by examiner

EXHAUST GAS TREATMENT DEVICE OF DIESEL ENGINE

CROSS-REFERENCE TO RELATED APPLICATION

This application is a Section 371 of International Application No. PCT/JP2010/054216, filed Mar. 12, 2010, which was published in the Japanese language on Nov. 4, 2010, under International Publication No. WO 2010/125865 A1, and the disclosure of which is incorporated herein by reference.

TECHNICAL FIELD

The present invention relates to an exhaust gas treatment device of a diesel engine, and more particularly, to an exhaust gas treatment device of a diesel engine that is capable of increasing the concentration of particulate matter (which is referred to as 'PM') in exhaust gas recirculation (which is referred to as 'EGR') gas.

Among the terms as will be used in the present invention, the PM is an acronym for particulate matter contained in exhaust gas, the EGR is for the exhaust gas recirculation as mentioned above, and DPF is for a diesel particulate filter.

BACKGROUND ART

An exhaust gas treatment device of a diesel engine in a conventional practice is configured to have an exhaust gas separator disposed on an exhaust gas flow passage to allow PM in exhaust gas to be localizedly positioned and thus to separate the exhaust gas into EGR gas containing the localizedly positioned PM and emission gas as the rest of the exhaust gas, thereby recirculating the EGR gas to a combustion chamber and emitting the emission gas to the air (For example, see cited prior art 1).

According to the conventional exhaust gas treatment device of the diesel engine, the PM contained in the EGR gas is burnt and treated by the combustion heat of the combustion chamber during the operation of the engine, and therefore, there is no need for the installation of the DPF. Alternatively, through the use of the DPF with the exhaust gas separator, the DPF can be small-sized. Since there is no need to reserve a large amount of PM in the exhaust gas separator, the size of the exhaust gas separator can be smaller than that of the DPF. In case where the exhaust gas separator is used in place of the DPF and in case where the DPF is used with the exhaust gas separator, advantageously, a small-sized diesel engine can be made.

According to the conventional practice, an electrode is disposed at the center of the upstream side of the exhaust gas separator, and an electrode is disposed on the outer peripheral wall of the exhaust gas separator, thereby charging the PM in the exhaust gas by means of corona discharge occurring between the electrodes. Also, an inner cylinder is disposed at the center of the downstream side of the exhaust gas separator, and the EGR gas is collected outside the inner cylinder, while the emission gas is being collected inside the inner cylinder. Since an emission gas entry inlet formed on the inner cylinder is opened along the upstream end of the inner cylinder, some problems have occurred.

PRIOR ART

Cited Prior Art

Cited prior art 1: Japanese Patent Publication No. 2007-278194 (See FIG. 2)

Problems to be Resolved by the Invention

One of the problems is that the concentration of the PM in the EGR gas is not sufficiently increased. That is, even though relatively heavy PM passing through the center of the upstream side of the exhaust gas separator is under an electrostatic force, the PM goes straight ahead by an inertial force and enters the inner cylinder through the emission gas entry inlet formed on the upstream end of the inner cylinder, thereby failing to sufficiently improve the concentration of the PM in the EGR gas. As a result, a large amount of PM is emitted to the air.

Accordingly, the present invention has been made in view of the above-mentioned problems occurring in the prior art, and it is an object of the present invention to provide an exhaust gas treatment device of a diesel engine that is capable of increasing the concentration of PM in EGR gas.

Means of Solving the Problems

To accomplish the above object, according to the present invention, there is provided an exhaust gas treatment device of a diesel engine having an exhaust gas separator disposed on an exhaust gas flow passage to allow PM in exhaust gas to be localizedly positioned and thus to separate the exhaust gas into EGR gas containing the localizedly positioned PM and emission gas as the rest of the exhaust gas, thereby recirculating the EGR gas to a combustion chamber and emitting the emission gas to the air, the exhaust gas treatment device including: a central cylinder disposed at the center of the exhaust gas separator and having a plurality of emission gas entry holes formed along the periphery wall thereof; and an exhaust gas swirl chamber formed around the central cylinder, wherein the exhaust gas separator has electrodes having different polarities from each other to allow the PM in the exhaust gas to be charged to a given polarity by means of corona discharge between the electrodes and thus to permit a peripheral wall surrounding the exhaust gas swirl chamber to have the electrode having the opposite polarity to the charged PM, and the charged PM in the exhaust gas swirling the exhaust gas swirl chamber is localizedly positioned around the peripheral wall of the exhaust gas swirl chamber through a centrifugal force and an electrostatic force to allow the exhaust gas containing the localizedly positioned PM to be separated as the EGR gas and sent to a terminal end portion of the exhaust gas swirl chamber, while the exhaust gas positioned around the central cylinder is being separated as the emission gas and sent to the interior of the central cylinder through the plurality of emission gas entry holes.

Advantageous Effect of the Invention (The Invention Defined by Claim 1)
The invention defined by claim 1 has the following effects:
[First Effect]
The concentration of the PM in the EGR gas can be increased.

Figure 2:
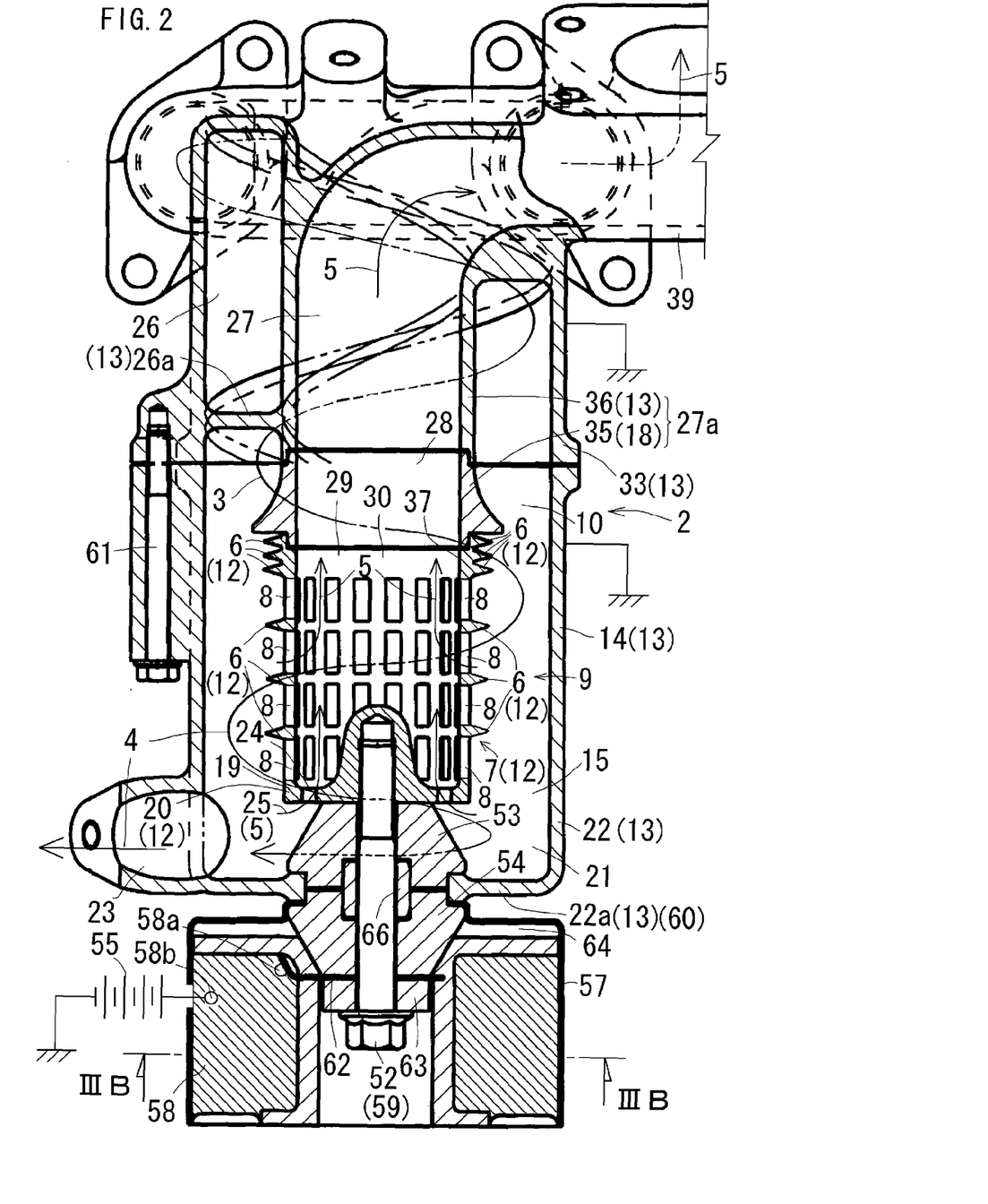
FIG. 2 is a longitudinal sectional view showing an exhaust gas separator of the exhaust gas treatment device in FIG. 1.

As shown in FIG. 2, the charged PM in the exhaust gas 3 swirling the exhaust gas swirl chamber 9 is localizedly positioned around the peripheral wall 14 of the exhaust gas swirl chamber 9 through a centrifugal force and an electrostatic force to allow the exhaust gas 3 containing the localizedly positioned PM to be separated as the EGR gas 4 and sent to the terminal end portion 15 of the exhaust gas swirl chamber 9, such that the PM is effectively localizedly positioned around the peripheral wall 14 of the exhaust gas swirl chamber 9 to permit the concentration of the PM in the EGR gas 4 to be increased.

[Second Effect]

The PM having different weights and particle sizes can be all contained in the EGR gas, without any selection.

As shown in FIG. 2, the charged PM in the exhaust gas 3 swirling the exhaust gas swirl chamber 9 is localizedly positioned around the peripheral wall 14 of the exhaust gas swirl chamber 9 through a centrifugal force and an electrostatic force to allow the exhaust gas 3 containing the localizedly positioned PM to be separated as the EGR gas 4 and sent to the terminal end portion 15 of the exhaust gas swirl chamber 9, such that both of the heavy PM to which the centrifugal force is effectively applied and the light PM to which the electrostatic force is effectively applied can be contained evenly in the EGR gas 4. Accordingly, the PM having different weights and particle sizes can be all contained in the EGR gas, without any selection, thereby making it difficult to emit the PM to the air.

(The Invention Defined by Claim 2)

The invention defined by claim 2 has the following effect, in addition to the effects obtained by claim 1:

[Effect]

The PM in the exhaust gas is difficult to enter the central cylinder.

As shown in FIG. 2, the central cylinder 7 has the electrode 12 having the same polarity as the charged PM, such that the charged PM in the exhaust gas 3 becomes distant from the central cylinder 7 by means of the electrostatic force, thereby making it hard for the PM to enter the central cylinder 7.

(The Invention Defined by Claim 3)

The invention defined by claim 3 has the following effect, in addition to the effect obtained by claim 2:

[Effect]

The charged PM in the exhaust gas is difficult to enter the emission gas entry holes.

Figure 4A:
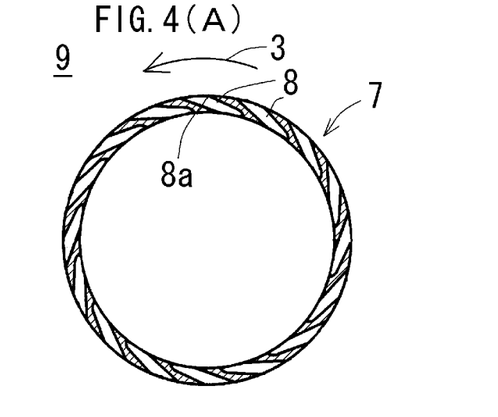
FIG. 4A is a cross-sectional plan view showing the central cylinder.

As shown in FIG. 4A, each of the emission gas entry holes has an acute angle portion 8a formed on the opened periphery thereof, such that the charged PM in the exhaust gas 3 is difficult to penetrate the emission gas entry holes 8. This is because a concentrated portion in the electric field is formed around the acute angle portion 8a to cause the entry of the charged PM to be suppressed.

(The Invention Defined by Claim 4)

The invention defined by claim 4 has the following effect, in addition to the effects obtained by any one of claims 1 to 3:

[Effect]

The PM in the exhaust gas is difficult to enter the emission gas entry holes by means of inertia.

As shown in FIG. 4A, each of the emission gas entry holes 8 formed toward the interior of the central cylinder 7 from the exhaust gas swirl chamber 9 has the reverse direction to the swirl direction of the exhaust gas 3, so that the PM in the exhaust gas 3 is difficult to enter the emission gas entry holes by means of inertia.

(The Invention Defined by Claim 5)

The invention defined by claim 5 has the following effect, in addition to the effects obtained by any one of claims 1 to 4:

[Effect]

The PM can be effectively charged in the exhaust gas swirl chamber.

As shown in FIG. 2, the central cylinder 7 has the electrode 12 having the same polarity as the charged PM and the plurality of discharge protrusions 6 formed protrudedly from the outer periphery thereof toward the peripheral wall 14 of the exhaust gas swirl chamber 9, so that the corona discharge stably occurs between the discharge protrusions 6 and the peripheral wall 14 of the exhaust gas swirl chamber 9, thereby effectively charging the PM in the exhaust gas swirl chamber 9.

(The Invention Defined by Claim 6)

The invention defined by claim 6 has the following effect, in addition to the effect obtained by claim 5:

[Effect]

The charged PM in the EGR gas is difficult to enter the emission gas entry holes by means of electrostatic force.

As shown in FIG. 2, in case where the plurality of emission gas entry holes 8 are formed in the axial direction of the central cylinder 7, the charged PM is moved from the upstream sides of the emission gas entry holes 8 and is brought into contact with the peripheral wall 14 of the exhaust gas swirl chamber 9, thereby losing the charge and entering the central cylinder 7 along the flow of the emission gas sucked into the central cylinder 7.

Thus, as shown in FIG. 2, the plurality of discharge protrusions 6 are formed between the emission gas entry holes formed serially in the axial direction of the central cylinder 7, so that the PM not penetrated into the upstream side emission gas entry holes 8 is passed through a corona discharge field generated by the downstream side discharge protrusions 6. As a result, the PM is charged to the same polarity as the central cylinder 7 and is suppressed in the entry into the downstream side emission gas entry holes 8, while being pulled near the peripheral wall 14 of the exhaust gas swirl chamber 9. Therefore the charged PM in the EGR gas is difficult to enter the emission gas entry holes 8 by means of electrostatic force.

(The Invention Defined by Claim 7)

The invention defined by claim 7 has the following effects, in addition to the effect obtained by claim 5 or 6:

[First Effect]

The concentration of PM in the EGR gas can be increased.

As shown in FIG. 2, the exhaust gas deflection guide wall 18 is disposed on the upstream side of the discharge protrusions 6, and the exhaust gas 3 moving toward the discharge protrusions 6 is deflected to the peripheral wall 14 of the exhaust gas swirl chamber 9 around the discharge protrusions 6 by means of the exhaust gas deflection guide wall 18, such that the PM in the exhaust gas 3 is easily localizedly positioned to the peripheral wall 14 of the exhaust gas swirl chamber 9 by means of inertia, thereby increasing the concentration of the PM in the EGR gas 4.

[Second Effect]

The pollution of the discharge protrusions caused by attachment of PM can be prevented.

The PM in the exhaust gas 3 is easily localizedly positioned to the peripheral wall 14 of the exhaust gas swirl chamber 9 by means of inertia, thereby preventing the discharge protrusions 6 from being polluted by the attachment of PM thereto.

(The Invention Defined by Claim 8)

The invention defined by claim 8 has the following effect, in addition to the effects obtained by any one of claims 1 to 7:

[Effect]

Even though the recirculation of the EGR gas stops, the reverse flow of the EGR gas from the EGR gas swirl chamber toward the exhaust gas swirl chamber can be suppressed.

As shown in FIG. 2, the gas components 25 of the EGR gas 4 overflowing from the center of the EGR gas swirl chamber 21 move from the gas vent holes 24 to the interior of the central cylinder 7, such that even though the recirculation of the EGR gas 4 stops or even in case where an amount of EGR gas recirculated is small, the reverse flow of the EGR gas 4 from the EGR gas swirl chamber 21 toward the exhaust gas swirl chamber 9 can be suppressed.

(The Invention Defined by Claim 9)

The invention defined by claim 9 has the following effect, in addition to the effect obtained by claim 8:

[Effect]

The charged PM in the EGR gas is difficult to enter the gas vent holes.

As shown in FIG. 2, the peripheral wall 22 of the EGR gas swirl chamber 21 has the electrode 13 having the different polarity from the charged PM, such that the charged PM in the EGR gas 4 swirling the EGR gas swirl chamber 21 is close to the peripheral wall 22 of the EGR gas swirl chamber 21 by means of the centrifugal force and the electrostatic force, thereby making it difficult for the charged PM to enter the gas vent holes 24.

(The Invention Defined by Claim 10)

The invention defined by claim 10 has the following effect, in addition to the effect obtained by claim 9:

[Effect]

The charged PM in the EGR gas is difficult to enter the gas vent holes.

As shown in FIG. 2, the terminal end wall 20 of the central cylinder 7 has the electrode 12 having the same polarity as the charged PM, such that the charged PM in the EGR gas 4 swirling the EGR gas swirl chamber 21 is distant from the terminal end wall 20 of the central cylinder 7 by means of the electrostatic force, thereby making it difficult for the charged PM to enter the gas vent holes 24.

(The Invention Defined by Claim 11)

The invention defined by claim 11 has the following effect, in addition to the effect obtained by claim 10:

[Effect]

The charged PM in the EGR gas is difficult to enter the gas vent holes.

Figure 4B:
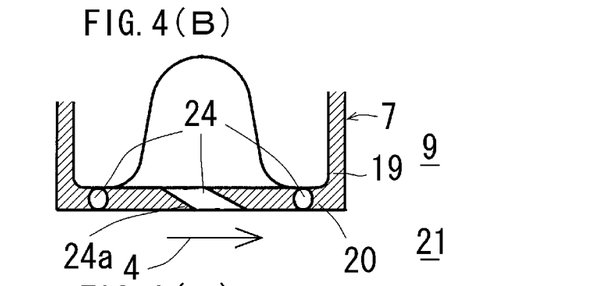
FIG. 4B is a longitudinal sectional view showing the terminal end portion of the central cylinder.

As shown in FIG. 4B, each of the gas vent holes 24 has the acute angle portion 24a formed on the opened periphery thereof, such that the charged PM in the EGR gas 4 is difficult to enter the gas vent holes 24. This is because a concentrated portion in the electric field is formed around the acute angle portion 24a to cause the entry of the charged PM to be suppressed.

(The Invention Defined by Claim 12)

The invention defined by claim 12 has the following effect, in addition to the effect obtained by any one of claims 8 to 11:

[Effect]

The charged PM in the EGR gas is difficult to enter the gas vent holes.

Figure 4C:
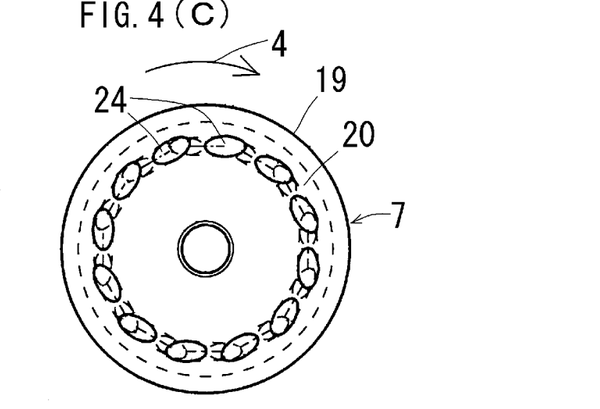
FIG. 4C is a bottom view thereof.

As shown in FIGS. 4B and 4C, the gas vent holes 24 formed toward the interior of the central cylinder 7 from the center of the EGR gas swirl chamber 21 have the reverse directions to the swirl direction of the EGR gas 4, so that the PM in the EGR gas 4 is difficult to enter the gas vent holes 24 by means of inertia.

(The Invention Defined by Claim 13)

The invention defined by claim 13 has the following effect, in addition to the effect obtained by any one of claims 1 to 12:

[Effect]

The concentration of PM in the EGR gas can be increased.

As shown in FIG. 2, the exhaust gas swirl approach passage 26 is formed along a spirally formed approach guide wall 26a on the upstream side of the exhaust gas swirl chamber 9, such that through the rectifying action of the exhaust gas swirl approach passage 26, the swirl speed of the exhaust gas 3 in the exhaust gas swirl chamber 9 can be improved, and the centrifugal force applied to the PM in the exhaust gas 3 becomes larger, thereby increasing the concentration of PM of the EGR gas 4.

(The Invention Defined by Claim 14)

The invention defined by claim 14 has the following effect, in addition to the effect obtained by claim 13:

[Effect]

The exhaust gas separator can be made compact.

As shown in FIG. 2, the emission gas-emitting passage 27 is formed at the center of the exhaust gas separator 2 surrounded by the exhaust gas swirl approach passage 26, and the inlet 28 of the emission gas-emitting passage 27 is formed to communicate with the outlet 30 formed along the starting end portion 29 of the central cylinder 7, such that the parts of the exhaust gas separator 2 can be disposed in a compact manner.

(The Invention Defined by Claim 15)

The invention defined by claim 15 has the following effect, in addition to the effect obtained by claim 13 or 14:

[Effect]

The PM can be effectively charged in the exhaust gas swirl approach passage.

As shown in FIG. 2, the central cylinder 7 and the peripheral wall 33 surrounding the exhaust gas swirl approach passage 26 have the electrodes 12 and 13 having different polarities from each other, such that the PM can be effectively charged in the exhaust gas swirl approach passage 26 by means of the corona discharge occurring between the electrodes 12 and 13.

(The Invention Defined by Claim 16)

The invention defined by claim 16 has the following effect, in addition to the effect obtained by claim 15:

[Effect]

The insulation between electrodes can be achieved by means of a simplified insulator.

As shown in FIG. 2, the peripheral wall 35 of the inlet 28 of the emission gas-emitting passage 27 is molded of an electrical insulator so as to electrically insulate the peripheral wall 14 of the exhaust gas swirl chamber 9, the peripheral wall 33 of the exhaust gas swirl approach passage 26 and the downstream side peripheral wall 36 of the emission gas-emitting passage 27, which have the electrodes 13 having different polarities from the central cylinder 7, from the central cylinder 7, thereby achieving the insulation between the electrodes 12 and 13 by means of the simplified insulator.

(The Invention Defined by Claim 17)

The invention defined by claim 17 has the following effect, in addition to the effect obtained by claim 16:

[First Effect]

The concentration of PM in the EGR gas can be increased.

As shown in FIG. 2, the peripheral wall 35 of the inlet 28 of the emission gas-emitting passage 27 is formed of the exhaust gas deflection guide wall 18, and the exhaust gas 3 moving toward the discharge protrusions 6 is deflected to the peripheral wall 14 of the exhaust gas swirl chamber 9 around the discharge protrusions 6 by means of the exhaust gas deflection guide wall 18, such that the PM in the exhaust gas 3 is easily localizedly positioned to the peripheral wall 14 of the exhaust gas swirl chamber 9 by means of the inertia, thereby increasing the concentration of the PM in the EGR gas.

[Second Effect]

The pollution of the discharge protrusions caused by attachment of PM can be prevented.

The PM in the exhaust gas 3 is easily localizedly positioned to the peripheral wall 14 of the exhaust gas swirl chamber 9 by means of the inertia, thereby preventing the discharge protrusions 6 from being polluted by the attachment of PM thereto.

(The Invention Defined by Claim 18)

The invention defined by claim 18 has the following effect, in addition to the effects obtained by claim 16 or 17:

[Effect]

The assembly process of parts can be shortened.

Figure 5:
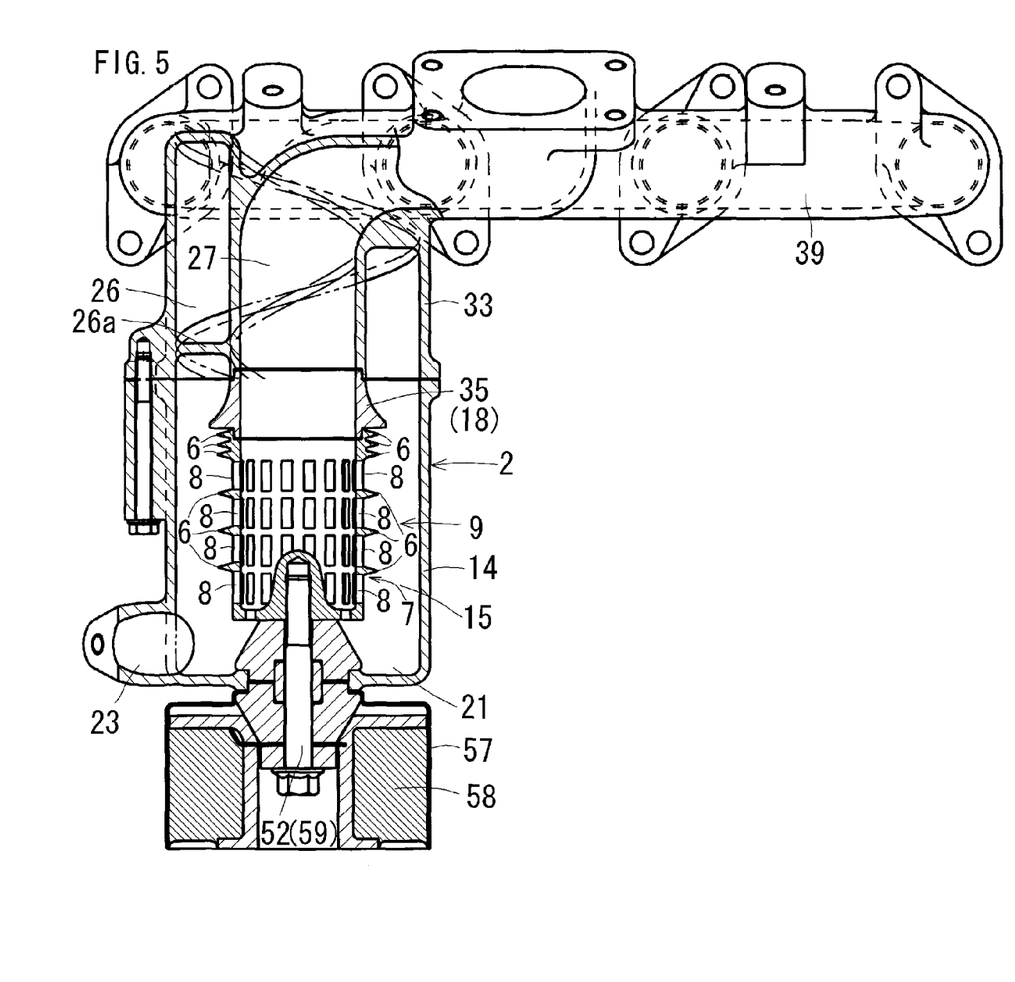
FIG. 5 is a side view showing an exhaust manifold having the exhaust gas separator of FIG. 2.
Figure 6:
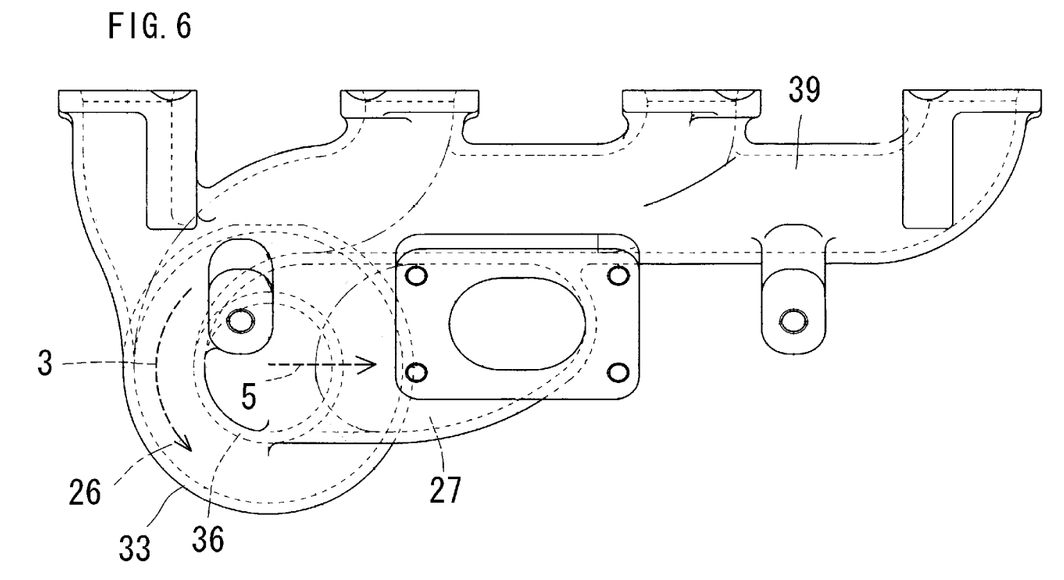
FIG. 6 is a plan view showing the exhaust manifold having the exhaust gas separator of FIG. 2.

As shown in FIGS. 2, 5 and 6, the peripheral wall 33 of the exhaust gas swirl approach passage 26 and the downstream side peripheral wall 36 of the emission gas-emitting passage 27 are molded integrally with the exhaust manifold 39, such that there is no need for the assembly of them to the exhaust manifold 39, thereby shortening the assembly process of the parts.

(The Invention Defined by Claim 19)

The invention defined by claim 19 has the following effect, in addition to the effects obtained by any one of claims 1 to 18:

[Effect]

The concentration of PM in the EGR gas can be increased.

Figure 1:
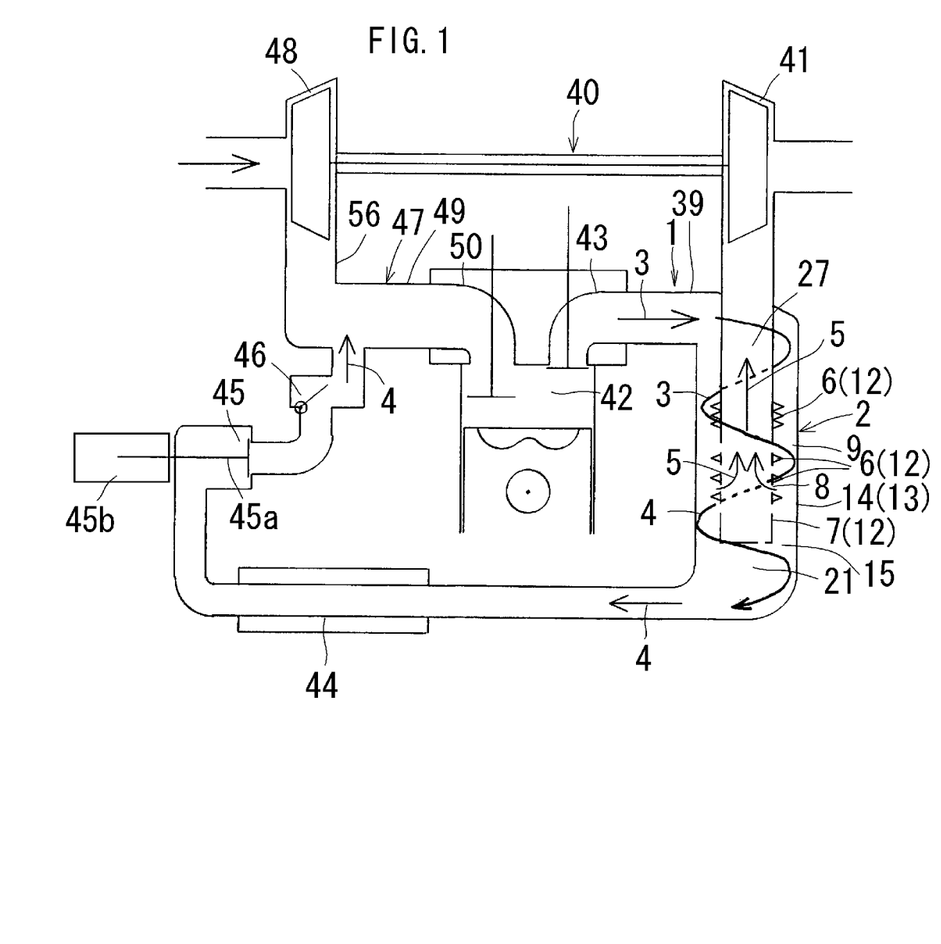
FIG. 1 is a schematic view showing an exhaust gas treatment device of a diesel engine according to a first embodiment of the present invention.

As shown in FIG. 1, the exhaust gas separator 2 is disposed upstream of the exhaust turbine 41 of the supercharger 40, such that the exhaust gas 3 is passed through the exhaust gas separator 2 before the loss of the exhaust energy into the exhaust turbine 41, which increases the swirl speed of the exhaust gas 3 in the exhaust gas swirl chamber 9 and improves the centrifugal force applied to the PM in the exhaust gas 3, thereby increasing the concentration of PM of the EGR gas 4.

(The Invention Defined by Claim 20)

The invention defined by claim 20 has the following effect, in addition to the effects obtained by any one of claims 1 to 19:

[First Effect]

The size of the engine Can be small.

Since the emission gas 5 is emitted to the air without using the DPF that regenerates by burning and removing the PM caught from the exhaust gas 3, the DPF can be eliminated and the size of the engine can be small.

[Second Effect]

The manufacturing cost of the engine can be lowered.

The DPF is removed, and the PM burning device like a burner, a heater and so on required for regeneration of the DPF and post-injection through common rails are not needed, such that the manufacturing cost of the engine can be lowered.

[Third Effect]

The cleaning of ash in PM is not required.

The DPF is removed, and the cleaning of ash (components of lubrication oil) in PM staying on the DPF after the regeneration of the DPF is not required.

Also, according to the present invention, the ash in the PM not burnt even in the combustion chamber 42 is discharged to a crankcase together with blow-by-gas from the combustion chamber 42 and is returned to lubrication oil.

(The Invention Defined by Claim 21)

The invention defined by claim 21 has the following effect, in addition to the effects obtained by any one of claims 1 to 20:

[Effect]

The exhaust gas treatment device can be configured in a compact manner.

As shown in FIG. 2, the circuit-accommodating case 57 is mounted on the end portion of the exhaust gas separator 2 so as to accommodate the boosting circuit 58 therein, and the boosted voltage through the boosting circuit 58 is applied to the electrodes 12 and 13 of the exhaust gas separator 2, such that the exhaust gas separator 2 and the circuit-accommodating case 57 are formed integrally with each other, thereby allowing the exhaust gas treatment device to be configured in a compact manner.

(The Invention Defined by Claim 22)

The invention defined by claim 22 has the following effect, in addition to the effect obtained by claim 21:

[Effect]

The wiring of a high voltage cable etc. on the outside of the exhaust gas treatment device is not required.

The conductor 59 electrically connected to the boosting circuit 58 is passed through the end wall 60 of the exhaust gas separator 2, and by means of the conductor 59, the boosted voltage through the boosting circuit 58 is applied to the electrodes 12 and 13 of the exhaust gas separator 2, such that a high voltage cable etc. for applying high voltage to the electrodes 12 and 13 from the boosting circuit 58 does not need to be wired on the outside of the exhaust gas treatment device.

DESCRIPTION OF DRAWINGS

FIGS. 3A and 3B are views showing the exhaust gas separator in FIG. 2, wherein

FIGS. 4A to 4C are views showing the central cylinder used in the exhaust gas separator in FIG. 2, wherein

FIGS. 8A and 8B are views showing the exhaust gas separator in FIG. 7, wherein

MODE FOR INVENTION

Figure 7:
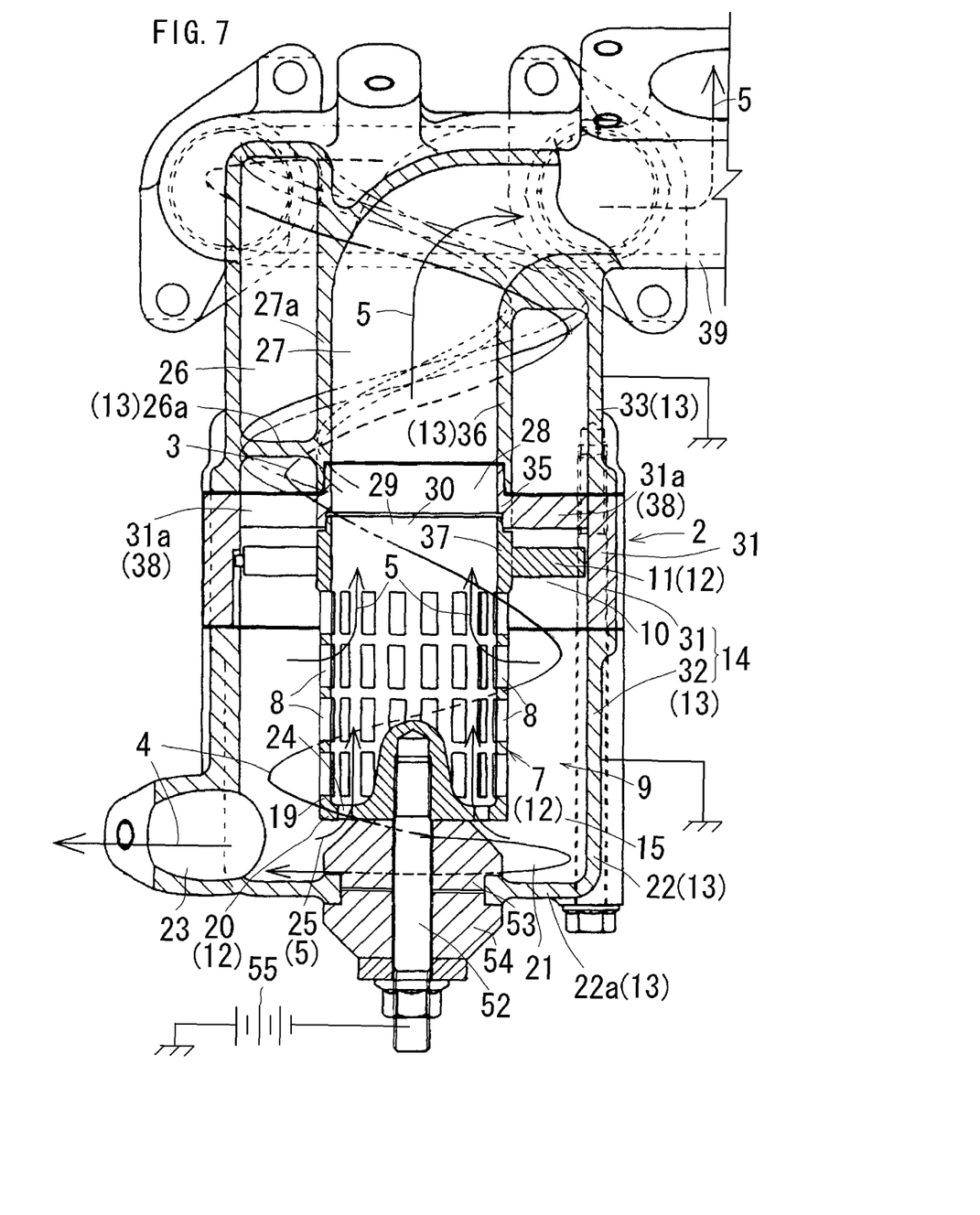
FIG. 7 is a longitudinal sectional view showing an exhaust gas separator of an exhaust gas treatment device of a diesel engine according to a second embodiment of the present invention.
Figure 8:
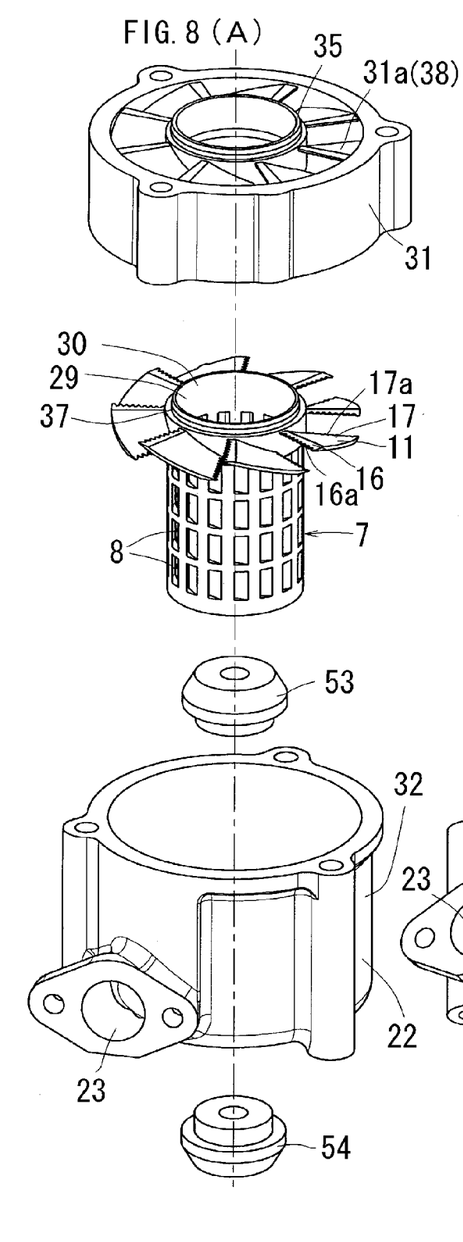
FIG. 8A is an exploded perspective view showing the exhaust gas separator when seen slantly from the top side thereof and FIG. 8B is an exploded perspective view showing the exhaust gas separator when seen slantly from the underside thereof.

FIGS. 1 to 6 show an exhaust gas treatment device of a diesel engine according to a first embodiment of the present invention, and FIGS. 7 to 8B show an exhaust gas treatment device of a diesel engine according to a second embodiment of the present invention. Hereinafter, an explanation on the exhaust gas treatment device of a diesel engine according to the preferred embodiments of the present invention will be given with reference to the attached drawings.

First, the configuration of the exhaust gas treatment device of a diesel engine according to the first embodiment of the present invention will be explained.

As shown in FIG. 1, an exhaust gas separator 2 is disposed on an exhaust gas flow passage 1 to allow PM in exhaust gas 3 to be localizedly positioned and thus to separate the exhaust gas 3 into EGR gas 4 containing the localizedly positioned PM and emission gas 5 as the rest of the exhaust gas 3, thereby recirculating the EGR gas 4 to a combustion chamber 42 and emitting the emission gas 5 to the air.

The exhaust gas flow passage 1 is formed by sequentially connecting an exhaust port 43, an exhaust manifold 39, the exhaust gas separator 2 and an exhaust turbine 41 of a supercharger 40. The EGR gas 4 is recirculated to an intake air flow passage 47 via an EGR cooler 44, an EGR valve chamber 45 and a check valve chamber 46, sequentially. The intake air flow passage 47 is formed by sequentially connecting a compressor 48 of the supercharger 40, a supercharging pipe 56, an intake manifold 49, and an intake port 50. An EGR valve 45a of the EGR valve chamber 45 is opened and closed by means of a valve actuator 45b in such a manner as to be adjusted in the degree of opening in accordance with the RPM and load of the engine.

Next, the configuration of the exhaust gas separator 2 will be explained.

As shown in FIG. 2, the exhaust gas separator 2 has a central cylinder 7 disposed at the center thereof, and the central cylinder 7 has a plurality of emission gas entry holes 8 formed along the peripheral wall thereof and an exhaust gas swirl chamber 9 formed therearound. Further, electrodes 12 and 13 having different polarities from each other are mounted on the exhaust gas separator 2, and the PM in the exhaust gas 3 becomes charged to a given polarity by means of corona discharge occurring between the electrodes 12 and 13.

A peripheral wall 14 is formed to surround the exhaust gas swirl chamber 9 and has the electrode 13 having the opposite polarity to the charged PM, such that the charged PM in the exhaust gas 3 swirling the exhaust gas swirl chamber 9 is localizedly positioned around the peripheral wall 14 of the exhaust gas swirl chamber 9 through a centrifugal force and an electrostatic force. Next, the exhaust gas 3 containing the localizedly positioned PM is separated as the EGR gas 4 and is sent to a terminal end portion 15 of the exhaust gas swirl chamber 9, and the exhaust gas 3 around the central cylinder 7 is separated as the emission gas 5 and is sent to the interior of the central cylinder 7 through the plurality of emission gas entry holes 8.

In the first embodiment of the present invention, the PM is charged to a negative polarity. Further, as shown in FIG. 2, the central cylinder 7 has the electrode 12 having the same negative polarity as the PM.

As shown in FIG. 2, the central cylinder 7 has a tube-like shape and the emission gas entry holes 8 are spaced apart serially from each other by a given distance along the generating line of the central cylinder 7, such that the series of emission gas entry holes 8 are spaced apart from each other by a given distance along the outer peripheral direction of the central cylinder 7. As shown in FIG. 4A, each of the emission gas entry holes 8 has an acute angle portion 8a formed on the opened periphery thereof. Thus, the emission gas entry holes 8 formed toward the interior of the central cylinder 7 from the exhaust gas swirl chamber 9 have the reverse directions to the swirl direction of the exhaust gas 3. As shown in FIG. 4A, the acute angle portion 8a is a portion being at an acute angle on the section perpendicular to the central axis of the central cylinder 7. Since the central cylinder 7 has the electrode 12 having the same polarity as the charged PM in the first embodiment of the present invention, the corona discharge occurs between the central cylinder 7 and the peripheral wall 14 of the exhaust gas swirl chamber 9 having the electrode 13 having the different polarity from the charged PM, thereby effectively charging exhaust particles in the exhaust gas swirl chamber 9.

Figure 3A:
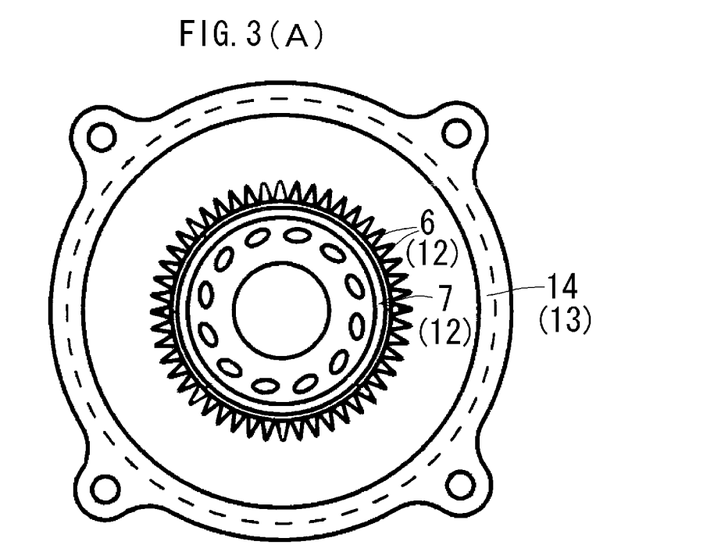
FIG. 3A is a plan view showing a central cylinder and a peripheral wall of an exhaust gas swirl chamber and FIG. 3B is a sectional view taken along the line IIIB-IIIB of FIG. 2.
Figure 3B:
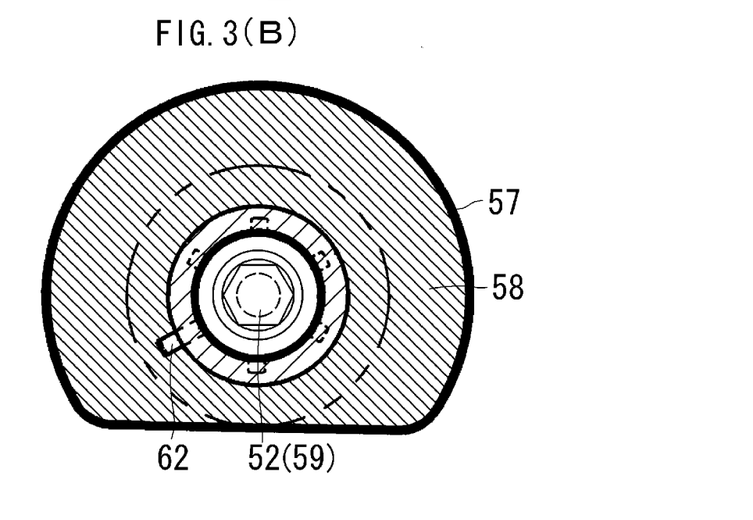

As shown in FIGS. 2 and 3A, the central cylinder 7 has the electrode 12 having the same polarity as the charged PM and a plurality of discharge protrusions 6 formed protrudedly from the outer periphery thereof toward the peripheral wall 14 of the exhaust gas swirl chamber 9.

As shown in FIG. 2, the discharge protrusions 6 have the electrodes 12 having the same negative polarity as the charged PM, and they are molded integrally with the central cylinder 7.

As shown in FIGS. 2 and 3A, the discharge protrusions 6 are formed serially along the outer periphery of the central cylinder 7, such that the series of discharge protrusions 6 are arranged in the axial length of the central cylinder 7.

As shown in FIG. 3A, each of the series of discharge protrusions 6 formed along the outer periphery of the central cylinder 7 has a shape of a saw tooth. As shown in FIG. 2, the three series of discharge protrusions 6 are formed adjacent to each other along the starting end portion 10 of the exhaust gas swirl chamber 9, that is, on the upstream side of the most upstream positioned emission gas entry holes 8.

As shown in FIG. 2, in the arrangements of the emission gas entry holes 8 along the axial length of the central cylinder 7, the discharge protrusions 6 are formed between the emission gas entry holes 8 adjacent to each other along the axial length of the central cylinder 7. Each of the discharge protrusions 6 is formed between the emission gas entry holes 8 adjacent to each other.

As shown in FIG. 2, an exhaust gas deflection guide wall is disposed on the upstream side of the discharge protrusions 6, and the exhaust gas 3 toward the discharge protrusions 6 is deflected to the peripheral wall 14 of the exhaust gas swirl chamber 9 around the discharge protrusions 6 by means of the exhaust gas deflection guide wall 18. The outer periphery of the exhaust gas deflection guide wall 18 is a curved shape taken by concavedly forming a peripheral surface shape of a truncated cone having a gradually large diameter as it goes toward the downstream side thereof on the inside thereof.

As shown in FIG. 2, a central cylinder terminal end wall 20 is disposed along a central cylinder terminal end portion 19 surrounded by the terminal end portion 15 of the exhaust gas swirl chamber 9, and an EGR gas swirl chamber 21 is disposed adjacent to the terminal end portion 15 of the exhaust gas swirl chamber 9. Next, an EGR gas outlet 23 is formed on a peripheral wall 22 surrounding the EGR gas swirl chamber 21, and gas vent holes 24 are formed along the central cylinder terminal end wall 20, such that gas components 25 of the EGR gas 4 overflowing from the center of the EGR gas swirl chamber 21 move from the gas vent holes 24 to the interior of the central cylinder 7, as the emission gas 5.

As shown in FIG. 2, the peripheral wall 22 of the EGR gas swirl chamber 21 and an end wall 22a of the EGR gas swirl chamber 21 have the electrodes 13 having the positive polarities different from the charged PM. Also, the central cylinder terminal end wall 20 has the electrode 12 having the same negative polarity as the charged PM. The central cylinder terminal end wall 20 is molded integrally with the peripheral wall of the central cylinder 7.

As shown in FIG. 4B, each of the gas vent holes 24 has an acute angle portion 24a formed on the opened periphery thereof. Thus, as shown in FIGS. 4B and 4C, the gas vent holes 24 formed toward the interior of the central cylinder 7 from the center of the EGR gas swirl chamber 21 have the reverse directions to the swirl direction of the EGR gas 4. As shown in FIG. 4B, the acute angle portion 24a is a portion being at an acute angle on the section in parallel to the central axis of the central cylinder 7 and containing the central axis of each gas vent hole 24. As shown in FIG. 2, the central cylinder 7 is disposed in up and down directions, and the central cylinder terminal end wall 20 is disposed along the bottom end periphery of the central cylinder 7. As shown in FIG. 4B, the gas vent holes 24 are formed inclined downwardly toward the EGR gas swirl chamber 21 from the interior of the central cylinder 7, and during the stop of the engine, the PM accumulating in the central cylinder 7 moves from the gas vent holes 24 toward the EGR gas swirl chamber 21 by means of the self gravity thereof.

As shown in FIG. 2, an exhaust gas swirl approach passage 26 is formed along a spirally formed approach guide wall 26a on the upstream side of the exhaust gas swirl chamber 9.

As shown in FIG. 2, an emission gas-emitting passage 27 is formed at the center of the exhaust gas separator 2 surrounded by the exhaust gas swirl approach passage 26, and an inlet 28 of the emission gas-emitting passage 27 is formed to communicate with an outlet 30 formed along a starting end portion 29 of the central cylinder 7.

As shown in FIG. 2, the peripheral wall 14 of the exhaust gas swirl chamber 9 and a peripheral wall 33 of the exhaust gas swirl approach passage 26 are coupled to each other by means of a mounting bolt 61.

The emission gas-emitting passage 27 has a peripheral wall 27a divided into a peripheral wall 35 of the inlet 28 of the emission gas-emitting passage 27 and a downstream side peripheral wall 36 of the emission gas-emitting passage 27 positioned downstream from the peripheral wall 35, and the peripheral wall 35 is interposed between the downstream side peripheral wall 36 of the emission gas-emitting passage 27 and a peripheral wall 37 of the outlet 30 of the central cylinder 7.

The peripheral wall 35 of the inlet 28 of the emission gas-emitting passage 27 is molded of an electrical insulator so as to electrically insulate the peripheral wall 14 of the exhaust gas swirl chamber 9, the peripheral wall 33 of the exhaust gas swirl approach passage 26 and the downstream side peripheral wall 36 of the emission gas-emitting passage 27, which have the electrodes 13 having different polarities from the central cylinder 7, from the central cylinder 7.

The peripheral wall 35 of the inlet 28 of the emission gas-emitting passage 27 is made from aluminum oxide.

As shown in FIG. 2, an input terminal 52 toward the discharge protrusions 6 is connected to the discharge protrusions 6 through the central cylinder 7. The input terminal 52 and the central cylinder 7 are electrically insulated from the end wall 22a of the EGR gas swirl chamber 21 by means of spacers 53 and 54 as an insulator fitted around the input terminal 52. The input terminal 52 toward the negative electrode 12 provided at the central cylinder 7 or the discharge protrusions 6 is connected to a negative output terminal 58a of a boosting circuit 58 by means of a conductive plate 62. The positive output of the boosting circuit 58 is connected to earth.

The peripheral wall 14 of the exhaust gas swirl chamber 9, the peripheral wall 22 of the EGR gas swirl chamber 21, the end wall 22a of the EGR gas swirl chamber 21, the peripheral wall 33 of the exhaust gas swirl approach passage 26, the downstream side peripheral wall 36 of the emission gas-emitting passage 27 and the approach guide wall 26a, which have the positive electrodes 13, are connected to earth (negative pole of battery) through a body of the engine. A reference numeral 55 in the drawing denotes a battery, and 58b denotes a positive input terminal of the boosting circuit 58.

An insulation tube 66 is disposed at the coupled portion between the spacers 53 and 54 in such a manner as to be fitted around the input terminal 52, thereby preventing discharge between the input terminal 52 and the end wall 22a of the EGR gas swirl chamber 21 from occurring.

As shown in FIGS. 2, 5 and 6, the peripheral wall 33 of the exhaust gas swirl approach passage 26, the downstream side peripheral wall 36 of the emission gas-emitting passage 27 and the approach guide wall 26a are molded integrally with the exhaust manifold 39. They are an integral casting product made of cast iron.

As shown in FIG. 1, the exhaust gas separator 2 is disposed upstream of the exhaust turbine 41 of the supercharger 40. Also, the emission gas 5 is emitted to the air without using the DPF that regenerates by burning and removing the PM caught from the exhaust gas 3.

As shown in FIGS. 2 and 3A, a circuit-accommodating case 57 is mounted on the end portion of the exhaust gas separator 2 so as to accommodate the boosting circuit 58 therein, and the boosted voltage through the boosting circuit 58 is applied to the electrodes 12 and 13 of the exhaust gas separator 2.

A conductor 59 electrically connected to the boosting circuit 58 is passed through an end wall 60 of the exhaust gas separator 2, and by means of the conductor 59, the boosted voltage through the boosting circuit 58 is applied to the electrodes 12 and 13 of the exhaust gas separator 2.

The conductor 59 becomes the input terminal 52, and the input terminal 52 is electrically connected to the negative output terminal 58a of the boosting circuit 58 through the conductive plate 62.

The circuit-accommodating case 57 takes a round-like shape and has the input terminal 52 and the conductive plate 62 posited at the center thereof and the boosting circuit 58 accommodated in a case around the input terminal 52 and the conductive plate 62. The conductive plate 62 is fixedly fitted between the insulator spacer 54 fitted around the input terminal 52 and a conductor washer 63, in such a manner as to be electrically connected to the input terminal 52. The circuit-accommodating case 57 further has a heat insulating air chamber 64 formed at the upper side of the boosting circuit 58.

Through the following description, the differences of the second embodiment of the present invention as shown in FIGS. 7 to 8B from the first embodiment of the present invention will be given.

Exhaust gas swirl guide wings 11 are disposed along the starting end portion 10 of the exhaust gas swirl chamber 9 and have the electrode 12 having the same polarity as the charged PM and acute angle portions 16a and 17a formed along both edge portions 16 and 17 thereof.

Through the rectifying action of the exhaust gas swirl guide wings 11, the swirl speed of the exhaust gas 3 in the exhaust gas swirl chamber 9 can be improved, and the centrifugal force applied to the PM in the exhaust gas 3 becomes larger, thereby increasing the concentration of PM of the EGR gas 4.

Further, the corona discharge occurs between the exhaust gas swirl guide wings 11 and the peripheral wall 14 of the exhaust gas swirl chamber 9 having the electrode 13 having the different polarity from the charged PM, thereby effectively charging exhaust particles in the exhaust gas swirl chamber 9.

Also, the PM in the exhaust gas 3 can be effectively charged because a concentrated portion in the electric field is formed around the acute angle portions 16a and 17a to generate the corona discharge through which charges are effectively applied to the PM.

The exhaust gas swirl guide wings 11 are disposed along the starting end portion 10 of the exhaust gas swirl chamber 9 and have the electrode 12 with the different polarity from that of the electrode 13 provided on the peripheral wall 33 surrounding the exhaust gas swirl approach passage 26.

That is, the exhaust gas swirl guide wings 11 have the negative electrode 12, and the peripheral wall 33 has the positive electrode 13.

The starting end portion 10 of the exhaust gas swirl chamber 9 is disposed around the peripheral wall 37 of the outlet 30 of the central cylinder 7, and the peripheral wall of the exhaust gas swirl chamber 9 is divided into a peripheral wall 31 surrounding the starting end portion 10 of the exhaust gas swirl chamber 9 and a downstream side peripheral wall 32 of the exhaust gas swirl chamber 9 formed downstream from the peripheral wall 31. The peripheral wall 31 surrounding the starting end portion 10 of the exhaust gas swirl chamber 9 is interposed between the peripheral wall 33 of the exhaust gas swirl approach passage 26 and the downstream side peripheral wall 32.

The peripheral wall 27a of the emission gas-emitting passage 27 is divided into the peripheral wall 35 of the inlet 28 of the emission gas-emitting passage 27 and the downstream side peripheral wall 36 positioned downstream from the peripheral wall 35, and the peripheral wall 35 is interposed between the downstream side peripheral wall 36 and the peripheral wall 37 of the outlet 30 of the central cylinder 7. The peripheral wall 31 of the starting end portion 10 of the exhaust gas swirl chamber 9, the peripheral wall 35 of the inlet 28 of the emission gas-emitting passage 27, and cross linkers 31a connecting them are molded integrally with one another, as an electrical insulator, which electrically insulate the downstream side peripheral wall 32 of the exhaust gas swirl chamber 9, the peripheral wall 33 of the exhaust gas swirl approach passage 26 and the downstream side peripheral wall 36 of the emission gas-emitting passage 27, which have the electrodes 13 having different polarities from the exhaust gas swirl guide wings 11, from the central cylinder 7 having the electrode 12 having the same polarity as the exhaust gas swirl guide wings 11.

Moreover, the electrical insulator electrically insulates the peripheral wall 22 of the EGR gas swirl chamber and the end wall 22a of the EGR gas swirl chamber 21, which have the electrodes 13 having different polarities from the central cylinder 7, from the central cylinder 7. The electrical insulator is made from aluminum oxide.

The assembly of the insulation parts can be conducted simultaneously.

The cross-linkers 31a are formed of upstream exhaust gas swirl guide wings 38 positioned upstream of the exhaust gas swirl guide wings 11. Through the rectifying action of the upstream exhaust gas swirl guide wings 38, therefore, the swirl speed of the exhaust gas 3 in the exhaust gas swirl chamber 9 can be improved, and the centrifugal force applied to the PM in the exhaust gas 3 becomes larger, thereby increasing the concentration of PM of the EGR gas 4.

Other configurations and functions of the second embodiment of the present invention are the same as those of the first embodiment of the present invention, and the same components in FIGS. 7 to 8B as in the first embodiments of the present invention are denoted by the same reference numerals as the first embodiment.

The present invention is conducted with the above-mentioned preferred embodiments, but it is not limited thereto. That is, the PM may be charged to the positive polarity, and in this case, the central cylinder 7 or the exhaust gas swirl guide wings 11 has the positive electrode having the same polarity as the charged PM, while the downstream side peripheral wall 32 of the exhaust gas swirl chamber 9, the peripheral wall 22 of the EGR gas swirl chamber 21, the end wall 22a of the EGR gas swirl chamber 21, the peripheral wall 33 of the exhaust gas swirl approach passage 26, the downstream side peripheral wall 36 of the emission gas-emitting passage 27, and the approach guide wall 26a have the negative electrode having the different polarity from the charged PM.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

DESCRIPTION OF REFERENCE NUMERALS

1: exhaust gas flow passage
2: exhaust gas separator
3: exhaust gas
4: EGR gas
5: emission gas
6: discharge protrusions
7: central cylinder
8: emission gas entry hole
8a: acute angle portion
9: exhaust gas swirl chamber
12: electrode
13: electrode
14: peripheral wall of exhaust gas swirl chamber
15: terminal end portion of exhaust gas swirl chamber
18: exhaust gas deflection guide wall
19: central cylinder terminal end portion
20: terminal end wall of central cylinder
21: EGR gas swirl chamber
22: peripheral wall of EGR gas swirl chamber
23: EGR gas outlet
24: gas vent holes
24a: acute angle portion
25: gas components
26: exhaust gas swirl approach passage
26a: approach guide wall
27: emission gas-emitting passage
27a: peripheral wall of emission gas-emitting passage
28: inlet of emission gas-emitting passage
29: starting end portion of central cylinder
30: outlet of central cylinder
33: peripheral wall of exhaust gas swirl approach passage
35: peripheral wall of inlet of emission gas-emitting passage
36: downstream side peripheral wall of emission gas-emitting passage
37: peripheral wall of outlet of central cylinder
39: exhaust manifold
40: supercharger
41: exhaust turbine
57: circuit-accommodating case
58: boosting circuit
59: conductor
60: end wall

The invention claimed is:

1. An exhaust gas treatment device of a diesel engine having an exhaust gas separator (2) disposed on an exhaust gas flow passage (1) to allow particulate material (PM) in exhaust gas (3) to be localizedly positioned and thus to separate the exhaust gas (3) into EGR gas (4) containing the localizedly positioned PM and emission gas (5) as the rest of the exhaust gas (3), thereby recirculating the EGR gas (4) to a combustion chamber (42) and emitting the emission gas (5) to the air, the exhaust gas treatment device comprising:

a central cylinder (7) disposed at the center of the exhaust gas separator (2), having an emission gas entry opening, an outlet (30) having a peripheral wall (37), and a plurality of discharge protrusions (6) protruding from an outer periphery of the central cylinder (7);

an exhaust gas swirl chamber (9), having a peripheral wall (14), surrounding the central cylinder (7), so that the plurality of discharge protrusions (6) protrude toward the peripheral wall (14) of the exhaust gas swirl chamber (9);

an exhaust gas deflection guide wall (18) adjacent the discharge protrusions (6);

an exhaust gas swirl approach passage (26), having a peripheral wall (33), along a spirally formed approach guide wall (26a) on an upstream side of the exhaust gas swirl chamber (9); and an emission gas-emitting passage (27), having a peripheral wall (27a) divided into a peripheral wall (35) of an inlet (28) thereof and a peripheral wall (36) downstream from the peripheral wall (35), the peripheral wall (35) of the inlet (28) being interposed between the downstream side peripheral wall (36) of the emission gas-emitting passage (27) and the peripheral wall (37) of the outlet (30) of the central cylinder (7), the peripheral wall (35) of the inlet (28) of the emission gas-emitting passage (27) being formed of the exhaust gas deflection guide wall (18), such that exhaust gas (3) moving toward the discharge protrusions (6) is deflected by the deflection guide wall (18) to the peripheral wall (14) of the exhaust gas swirl chamber (9) around the discharge protrusions (6), the peripheral wall (35) of the inlet (28) being molded of an electrical insulator to electrically insulate the peripheral wall (14) of the exhaust gas swirl chamber (9), the peripheral wall (33) of the exhaust gas swirl approach passage (26) and the downstream side peripheral wall (36) of the emission gas-emitting passage (27), wherein:

the exhaust gas separator (2) has electrodes (12, 13) having different polarities from each other to allow the PM in the exhaust gas (3) to be charged to a given polarity by means of corona discharge between the electrodes (12, 13);

the central cylinder (7) has electrodes (12) having the same polarity as the charged PM; and the peripheral wall (14) of the exhaust gas swirl chamber (9), the peripheral wall (33) of the exhaust gas swirl approach passage (26) and the downstream side peripheral wall (36) of the emission gas-emitting passage (27) electrodes (13) having an opposite polarity from electrodes (12) of the central cylinder (7) and the charged PM, so that the charged PM in the exhaust gas (3) swirling the exhaust gas swirl chamber (9) is localizedly positioned around the peripheral wall (14) of the exhaust gas swirl chamber (9) through a centrifugal force and an electrostatic force to allow the exhaust gas (3) containing the localizedly positioned PM to be separated as the EGR gas (4) and sent to a terminal end portion (15) of the exhaust gas swirl chamber (9), while the exhaust gas (3) around the central cylinder (7) is being separated as the emission gas (5) and sent to the interior of the central cylinder (7) through the emission gas entry opening.

2. The exhaust gas treatment device of a diesel engine according to claim 1, wherein the emission gas-emitting passage (27) is formed at a center of the exhaust gas separator (2), the exhaust gas separator (2) is surrounded by the exhaust gas swirl approach passage (26), and the central cylinder (7) includes a starting end portion (29) defining the outlet (30) of the central cylinder (7) and the inlet (28) of the emission gas-emitting passage (27) communicates with the outlet (30) of the central cylinder (7).

3. The exhaust gas treatment device of a diesel engine according to claim 1, wherein the emission gas (5) is emitted to the air without using a diesel particulate filter (DPF) that regenerates by burning and removing the particulate material (PM) caught from the exhaust gas (3).

4. The exhaust gas treatment device of a diesel engine according to claim 1, wherein the central cylinder (7) and the charged particulate material (PM) have the electrode (12) of the same polarity as the plurality of discharge protrusions (6).

5. The exhaust gas treatment device of a diesel engine according to claim 1, wherein the exhaust gas separator (2) is disposed upstream of an exhaust turbine (41) of a supercharger (40).

6. The exhaust gas treatment device of a diesel engine according to claim 1, wherein the exhaust gas separator (2) has a circuit-accommodating case (57) mounted on an end portion thereof to accommodate a boosting circuit (58) therein, wherein a boosted voltage through the boosting circuit (58) is applied to the electrodes (12, 13) of the exhaust gas separator (2).

7. The exhaust gas treatment device of a diesel engine according to claim 6, wherein the boosting circuit (58) has a conductor (59) electrically connected thereto, the conductor (59) being passed through an end wall (60) of the exhaust gas separator (2), such that by means of the conductor (59), the boosted voltage through the boosting circuit (58) is applied to the electrodes (12, 13) of the exhaust gas separator (2).

8. The exhaust gas treatment device of a diesel engine according to claim 1, wherein the emission gas entry opening is comprised of a plurality of emission gas entry holes (8) formed along a periphery wall of the central cylinder (7).

9. The exhaust gas treatment device of a diesel engine according to claim 8, wherein each of the emission gas entry holes (8) has an acute angle portion (8a) formed on an opened periphery thereof.

10. The exhaust gas treatment device of a diesel engine according to claim 8, wherein the emission gas entry holes (8) formed toward an interior of the central cylinder (7) from the exhaust gas swirl chamber (9) have a reverse direction to a swirl direction of the exhaust gas (3).

11. The exhaust gas treatment device of a diesel engine according to claim 1, wherein the emission gas entry opening is comprised of a plurality of emission gas entry holes (8) formed along the periphery wall of the central cylinder (7), the plurality of emission gas entry holes (8) being formed serially in an axial direction of the central cylinder (7), and the plurality of discharge protrusions (6) being formed between the emission gas entry holes (8).

12. The exhaust gas treatment device of a diesel engine according to claim 11, wherein the exhaust gas deflection guide wall (18) is disposed on the upstream side of the discharge protrusions (6).

13. The exhaust gas treatment device of a diesel engine according to claim 1, wherein a terminal end wall (20) is disposed along a terminal end portion (19) of the central cylinder (7) surrounded by a terminal end portion (15) of the exhaust gas swirl chamber (9), an EGR gas swirl chamber (21) is disposed adjacent to the terminal end portion (15) of the exhaust gas swirl chamber (9), an EGR gas outlet (23) is formed on a peripheral wall (22) surrounding the EGR gas swirl chamber (21), and gas vent holes (24) are formed along the terminal end wall (20) of the central cylinder (7), such that gas components (25) of the EGR gas (4) overflowing from the center of the EGR gas swirl chamber (21) move from the gas vent holes (24) to an interior of the central cylinder (7), as the emission gas (5).

14. An exhaust gas treatment device of a diesel engine having an exhaust gas separator (2) disposed on an exhaust gas flow passage (1) to allow particulate material (PM) in exhaust gas (3) to be localizedly positioned and thus to separate the exhaust gas (3) into EGR gas (4) containing the localizedly positioned PM and emission gas (5) as the rest of the exhaust gas (3), thereby recirculating the EGR gas (4) to a combustion chamber (42) and emitting the emission gas (5) to the air, the exhaust gas treatment device comprising:

a central cylinder (7) disposed at the center of the exhaust gas separator (2), having an emission gas entry opening, and an outlet (30) having a peripheral wall (37);

an exhaust gas swirl chamber (9), having a peripheral wall (14), surrounding the central cylinder (7);

an exhaust gas swirl approach passage (26), having a peripheral wall (33), along a spirally formed approach guide wall (26a) on an upstream side of the exhaust gas swirl chamber (9)

an emission gas-emitting passage (27), having a peripheral wall (27a) divided into a peripheral wall (35) of an inlet (28) thereof and a peripheral wall (36) downstream from the peripheral wall (35), the peripheral wall (35) of the inlet (28) being interposed between the downstream side peripheral wall (36) of the emission gas-emitting passage (27) and the peripheral wall (37) of the outlet (30) of the central cylinder (7), the peripheral wall (35) of the inlet (28) of the emission gas-emitting passage (27) being molded of an electrical insulator to electrically insulate the peripheral wall (14) of the exhaust gas swirl chamber (9), the peripheral wall (33) of the exhaust gas swirl approach passage (26) and the downstream side peripheral wall (36) of the emission gas-emitting passage (27); and an exhaust manifold integrally molded with the peripheral wall (33) of the exhaust gas swirl approach passage (26) and the downstream side peripheral wall (36) of the emission gas-emitting passage (27), wherein:

the exhaust gas separator (2) has electrodes (12, 13) having different polarities from each other to allow the PM in the exhaust gas (3) to be charged to a given polarity by means of corona discharge between the electrodes (12, 13);

the peripheral wall (14) of the exhaust gas swirl chamber (9), the peripheral wall (33) of the exhaust gas swirl approach passage (26) and the downstream side peripheral wall (36) of the emission gas-emitting passage (27) have electrodes (13) having an opposite polarity from electrodes (12) of the charged PM, so that the charged PM in the exhaust gas (3) swirling the exhaust gas swirl chamber (9) is localizedly positioned around the peripheral wall (14) of the exhaust gas swirl chamber (9) through a centrifugal force and an electrostatic force to allow the exhaust gas (3) containing the localizedly positioned PM to be separated as the EGR gas (4) and sent to a terminal end portion (15) of the exhaust gas swirl chamber (9), while the exhaust gas (3) around the central cylinder (7) is being separated as the emission gas (5) and sent to the interior of the central cylinder (7) through the emission gas entry.

15. An exhaust gas treatment device of a diesel engine having an exhaust gas separator (2) disposed on an exhaust gas flow passage (1) to allow particulate material (PM) in exhaust gas (3) to be localizedly positioned and thus to separate the exhaust gas (3) into EGR gas (4) containing the localizedly positioned PM and emission gas (5) as the rest of the exhaust gas (3), thereby recirculating the EGR gas (4) to a combustion chamber (42) and emitting the emission gas (5) to the air, the exhaust gas treatment device comprising:

a central cylinder (7) disposed at the center of the exhaust gas separator (2), having an emission gas entry opening, and a plurality of discharge protrusions (6) protruding from an outer periphery of the central cylinder (7), said emission gas entry opening comprising a plurality of emission gas entry holes (8) formed along a periphery wall of the central cylinder (7), the plurality of emission gas entry holes (8) being formed serially in an axial direction of the central cylinder (7), and the plurality of discharge protrusions (6) being formed between the emission gas entry holes (8);

an exhaust gas swirl chamber (9), having a peripheral wall (14), surrounding the central cylinder (7), the plurality of discharge protrusions (6) protruding toward the peripheral wall (14) of the exhaust gas swirl chamber (9); and an exhaust gas deflection guide wall (18) formed upstream of the discharge protrusions (6), such that exhaust gas (3) moving toward the discharge protrusions (6) is deflected by the deflection guide wall (18) to the peripheral wall (14) of the exhaust gas swirl chamber (9) around the discharge protrusions (6);

wherein:

the exhaust gas separator (2) has electrodes (12, 13) having different polarities from each other to allow the PM in the exhaust gas (3) to be charged to, a given polarity by means of corona discharge between the electrodes (12, 13);

the central cylinder (7) has electrodes (12) having the same polarity as the charged PM; and the peripheral wall (14) of the exhaust gas swirl chamber (9) having an opposite polarity to the charged PM, so that the charged PM in the exhaust gas (3) swirling the exhaust gas swirl chamber (9) is localizedly positioned around the peripheral wall (14) of the exhaust gas swirl chamber (9) through a centrifugal force and an electrostatic force to allow the exhaust gas (3) containing the localizedly positioned PM to be separated as the EGR gas (4) and sent to a terminal end portion (15) of the exhaust gas swirl chamber (9), while the exhaust gas (3) around the central cylinder (7) is being separated as the emission gas (5) and sent to the interior of the central cylinder (7) through the emission gas entry opening.

16. An exhaust gas treatment device of a diesel engine having an exhaust gas separator (2) disposed on an exhaust gas flow passage (1) to allow particulate material (PM) in exhaust gas (3) to be localizedly positioned and thus to separate the exhaust gas (3) into EGR gas (4) containing the localizedly positioned PM and emission gas (5) as the rest of the exhaust gas (3), thereby recirculating the EGR gas (4) to a combustion chamber (42) and emitting the emission gas (5) to the air, the exhaust gas treatment device comprising:

a central cylinder (7) disposed at the center of the exhaust gas separator (2), having an emission gas entry opening;

an exhaust gas swirl chamber (9), having a peripheral wall (14), surrounding the central cylinder (7);

a terminal end wall (20) disposed along a terminal end portion (19) of the central cylinder (7), upstream from the emission gas entry opening of the central cylinder (7), and surrounded by a terminal end portion (15) of the exhaust gas swirl chamber (9), an EGR gas swirl chamber (21) disposed adjacent to the terminal end portion (15) of the exhaust gas swirl chamber (9);

an EGR gas outlet (23) formed on a peripheral wall (22) surrounding the EGR gas swirl chamber (21), and a plurality of gas vent holes (24) formed along the terminal end wall (20) of the central cylinder (7), such that gas components (25) of the EGR gas (4) overflowing from the center of the EGR gas swirl chamber (21) can move from the gas vent holes (24) to an interior of the central cylinder (7), as the emission gas (5);

wherein:

the exhaust gas separator (2) has electrodes (12, 13) having different polarities from each other to allow the PM in the exhaust gas (3) to be charged to a given polarity by means of corona discharge between the electrodes (12, 13); and the peripheral wall (14) of the exhaust gas swirl chamber (9) having an opposite polarity to the charged PM, so that the charged PM in the exhaust gas (3) swirling the exhaust gas swirl chamber (9) is localizedly positioned around the peripheral wall (14) of the exhaust gas swirl chamber (9) through a centrifugal force and an electrostatic force to allow the exhaust gas (3) containing the localizedly positioned PM to be separated as the EGR gas (4) and sent to the terminal end portion (15) of the exhaust gas swirl chamber (9), while the exhaust gas (3) around the central cylinder (7) is being separated as the emission gas (5) and sent to the interior of the central cylinder (7) through the emission gas entry opening.

17. The exhaust gas treatment device of a diesel engine according to claim 16, wherein the peripheral wall (22) of the EGR gas swirl chamber (21) has an electrode (13) having a different polarity from the charged PM.

18. The exhaust gas treatment device of a diesel engine according to claim 17, wherein the terminal end wall (20) of the central cylinder (7) has an electrode (12) having the same polarity as the charged PM.

19. The exhaust gas treatment device of a diesel engine according to claim 18, wherein each of the gas vent holes (24) has an acute angle portion (24*a*) formed on an opened periphery thereof.

20. The exhaust gas treatment device of a diesel engine according to claim 16, wherein the gas vent holes (24) formed toward an interior of the central cylinder (7) from the center of the EGR gas swirl chamber (21) have a reverse direction to a swirl direction of the EGR gas (4).

* * * * *